T. L. LOOSE.
ORDNANCE EQUIPMENT.
APPLICATION FILED MAY 15, 1916.

1,315,139.

Patented Sept. 2, 1919.
8 SHEETS—SHEET 6.

T. L. LOOSE.
ORDNANCE EQUIPMENT.
APPLICATION FILED MAY 15, 1916.

1,315,139.

Patented Sept. 2, 1919.
8 SHEETS—SHEET 8.

Witnesses:

Inventor
Theron L. Loose
By Sturtevant & Mason
Attorneys

UNITED STATES PATENT OFFICE.

THERON L. LOOSE, OF SPRINGFIELD, MASSACHUSETTS, ASSIGNOR TO HENDEE MANUFACTURING COMPANY, OF SPRINGFIELD, MASSACHUSETTS, A CORPORATION OF MASSACHUSETTS.

ORDNANCE EQUIPMENT.

1,315,139.            Specification of Letters Patent.          Patented Sept. 2, 1919.

Application filed May 15, 1916. Serial No. 97,668.

*To all whom it may concern:*

Be it known that I, THERON L. LOOSE, a citizen of the United States, residing at Springfield, in the county of Hampden, State of Massachusetts, have invented certain new and useful Improvements in Ordnance Equipment, of which the following is a description, reference being had to the accompanying drawing and to the figures of reference marked thereon.

This invention relates to new and useful improvements in ordnance equipment, and has for an object the production of a portable wheel-mounted carriage adapted to support a field piece, preferably of the machine gun type, and which is connected to a motorcycle for transportation thereby, and is adapted to be attached and detached therefrom in a minimum amount of time. By this arrangement, when the gun carriage with the gun thereon is detached from the motorcycle, each becomes an independent unit, capable of performing the usual functions; when attached the motorcycle serves as a means of transportation for the gun and the operators thereof, and if desired the machine gun may be operated while being moved from place to place, as in advance or retreat.

I am aware that it has been heretofore proposed to provide a gun-carriage for attachment to and detachment from a motorcycle, whereby the latter may serve to transport the gun from one point to another, but in one of the proposed constructions the gun-carriage itself is provided with only one wheel, and, therefore, even when stationary and in use the motorcycle must be coupled up to the carriage.

Another modification proposed has been to provide the gun carriage carrying the machine gun for attachment to a motorcycle, and to make one of the wheels of such gun carriage attachable and detachable, so that when the gun carriage is being transported by the motorcycle, one of the gun carriage wheels is taken off and supported on the gun carriage frame, and then when the carriage is detached from the motorcycle the wheel must be applied to its axle on the gun carriage to properly support the gun for firing position.

A primary object of the present invention is to provide a combined motorcycle and gun carriage in which connection and disconnection may be made in the shortest possible time, and when the parts are disconnected each element shall be complete in itself, the second wheel of the gun carriage being permanently attached to the gun carriage, but being so supported as that it can be moved without disconnection to operative or inoperative position.

Another object of this invention resides in the production of a combined motorcycle and two-wheel mounted field piece, in which one wheel of the mounted field piece becomes complementary to the rear wheel of the motorcycle when the field piece is attached thereto, making a three-wheel vehicle.

Another object of this invention is the production of a combined motor-driven cycle and wheel-mounted field piece, in which the wheels of said wheel-mounted field piece are relatively positioned into and out of axial alinement one with another, when disengaged and connected to the said motor-driven cycle respectively.

A further object of this invention is to provide a combined motor vehicle and wheel-mounted field piece, in which one of the wheels of the mounted field piece becomes a complementary wheel with one of the wheels of the motor vehicle when attached thereto, and the other of said wheels of the field piece remains sufficiently elevated to clear the ground and have no traction therewith.

A still further object of the present machine is the production of a combined motorcycle and wheel-mounted field piece of the regulation army type, including novel means for readily assembling the two in a minimum amount of time, and means for rapidly and effectively disassembling the same when going into action.

For the furtherance, therefore, of these objects, the invention consists in various combinations and arrangements of parts including the special means for attachment of the gun carriage to the motorcycle; special framework construction whereby the parts are supported and braced and all danger of strain on the parts of the motorcycle and danger of the front wheel getting out of alinement, are avoided and special means for throwing one of the wheels of the side car or gun carriage into and out of axial alinement with the other wheel, whereby it becomes an idle wheel or not, as desired.

The invention includes various other matters hereinafter described and referred to in the appended claims.

In the drawings, which show by way of illustration one embodiment of the invention,—

The present invention has been primarily designed for use in military operations requiring greatest possible speed in covering large territories, and at the same time carrying a suitable machine gun which can be readily detached, easily positioned under any available cover and immediately put in operation.

It is customary to detail two men for operating this equipment, and numerous advantages will be apparent in the manipulation of the combined and separate devices, as will more fully hereinafter appear.

Referring to the drawings, the combined device comprises a motorcycle 1 of any well known construction, and a wheel-mounted field piece or gun-carriage 2 provided with a machine gun 3. This machine gun may be of the regulation type, and includes the usual full equipment of shield and other parts, which will not be described.

Figure 3:
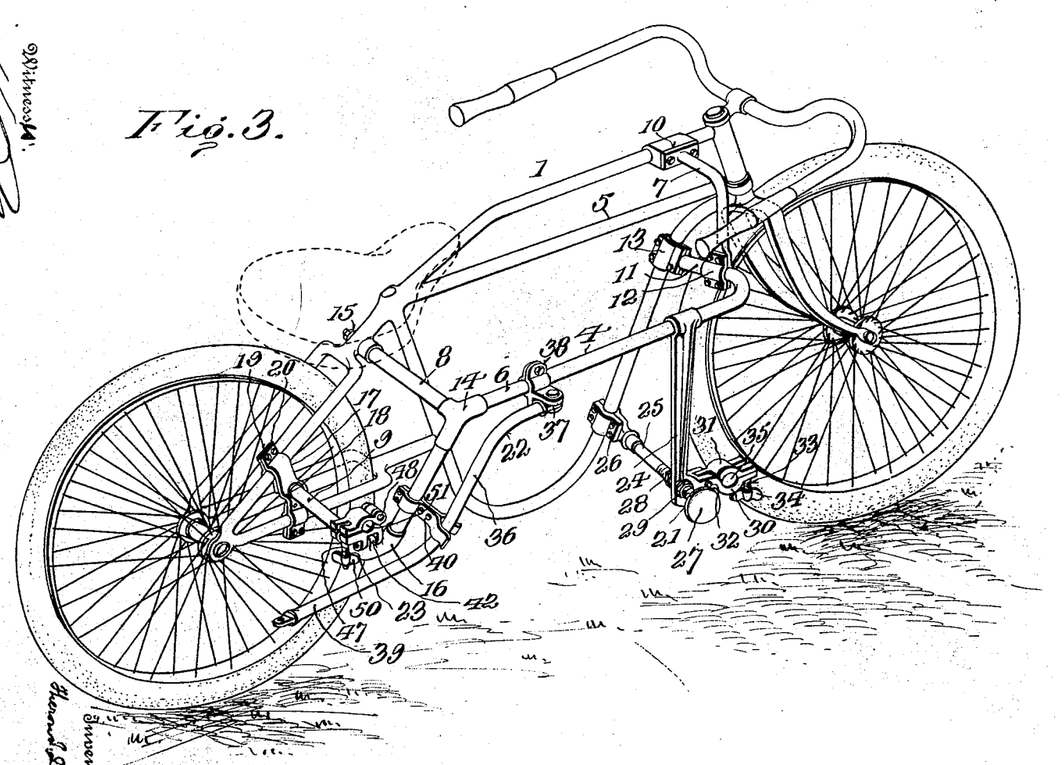
Fig. 3 is a perspective view of the motorcycle showing the wheel-mounted field piece detached and the connecting means attached to the motorcycle frame.

The motorcycle 1 is preferably of the high power type and is provided with an auxiliary frame 4 secured to the frame 5 of the motorcycle. This auxiliary frame includes a substantially parallel bar 6 extending longitudinally of the motorcycle and spacing and supporting lateral braces 7, 8 and 9. The brace 7 is secured to the uppermost bar of the main frame of the motorcycle at 10, and depends downwardly as shown in Fig. 3, to an offset 11 in the parallel bar 6, to which it is secured by the clamp 12. The offset 11 in the bar 6 extends inwardly and is secured to the main frame of the motorcycle at 13. The brace 8 is spaced a sufficient distance from the forward brace 7, so as to permit of the operator of the motorcycle having free movement of his leg within the auxiliary frame. The brace extends from the angular T head 14 in the parallel bar 6 to the main frame of the motorcycle, where it is secured by a suitable connection 15.

The brace 9 connects the L-shaped angular head 16 in the parallel bar 6 with one side of the rear forks of the motorcycle (see Fig. 1), and is in a plane below the level of brace 8. The brace 9 is fitted intermediate the angular and horizontal rear forks of the motorcycle and is held within the strap 17 by a suitable connection 18. The strap 17 comprises a form of double clamp 19 and 20 adapted to encircle the side bars of the angular and horizontal rear forks.

From this construction it will be seen that an auxiliary frame is provided wherein the several points of suspension and bracing produce a uniform stability of the motorcycle when the gun carriage is attached thereto. It will also be apparent that any tendency of the front wheel of the motorcycle to cant is prevented, and that the manipulation thereof remains free and easy when the gun carriage or any other form of side car is attached thereto.

On the auxiliary frame 4 and more especially on the parallel bar 6 are a plurality of coupling devices for attaching the gun carriage to the motorcycle. These coupling devices consist of a forward clamping device 21, an intermediate bracing and connecting bar 22, and a rear clamping device 23. These devices receive certain mating devices carried by the gun carriage, to be hereinafter described.

The forward coupling device 21 is supported by the arm 24 depending from the parallel bar 6, and is further braced by the rod 25 secured at 26 projecting from the drop portion of the main frame of the motorcycle. This rod 25 passes through the depending arm 24 and receives on its outer end an internally threaded knob or shield 27, the purpose of which is to elevate and protect the said coupling members and other portions of the motorcycle from the dirt and other substances when it is laid on its side, or otherwise hidden in ambush. Locking nuts 28, 29, provide for adjustment and holding of the arm 24.

The coupling device 21 includes a lower jaw 30 formed integral with the arm 24, and an upper jaw 31 pivoted to said lower jaw at 32.

A threaded bolt 33 is pivoted to said upper jaw 31 and is adapted to swing within a bifurcated portion of the lower jaw 30 and receive a thumb nut 34 on the outer end thereof. An opening 35 is formed when these two jaws are brought together which receives the end of a tongue and brace of the gun carriage when attached to the motorcycle.

Figure 14:
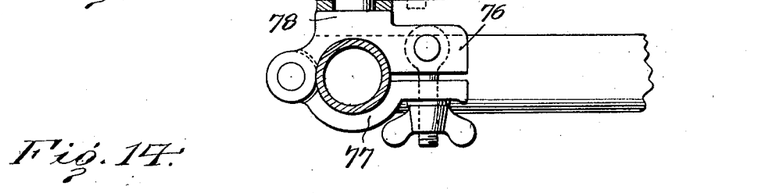
Fig. 14 is a detail view of the pivotal connection of the lateral bracing and connecting bar.

The intermediate connecting device 22 comprises an offset bar 36 pivotally connected at 37 to an adjustable clamp 38 secured to the parallel bar 6 of the auxiliary frame 4. This pivotal connection may be of the spring type, as more clearly shown in Fig. 14. The offset in the bar 36 lowers the extremity 39 of the said bar for connection with the gun carriage as will more fully hereinafter appear. As shown in Fig. 3 a retaining device 40 may be provided on the offset portion of the parallel bar 6 so as to hold the bar 36 against the side of the motorcycle when it is used for scouting and other purposes apart from the gun carriage.

The rear coupling device includes a hinged or swivel connection 41 (see Figs. 3 and 16) formed on the L-shaped angular head 16 provided at the lower end of the offset in the parallel bar 6.

Figures 15, 16:
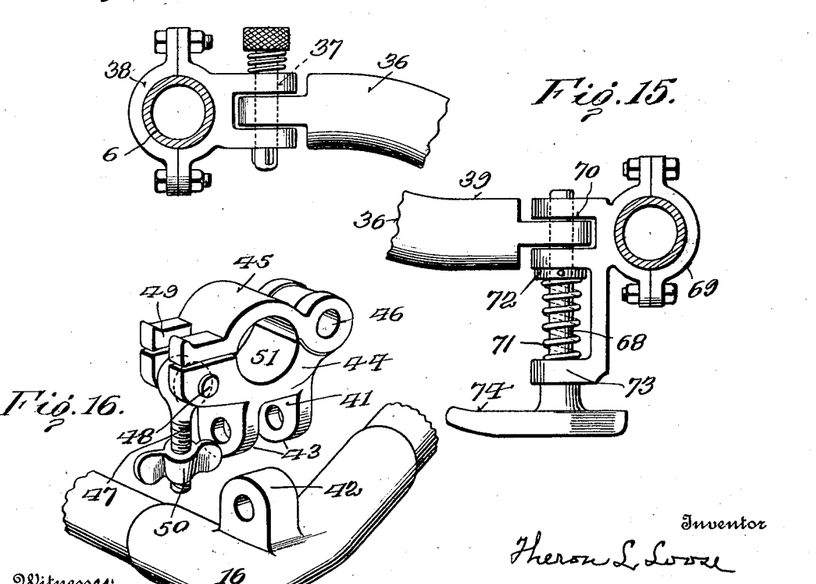
Fig. 15 is a similar view of the pivotal connection at the opposite end of said bar, showing the projecting finger or foot piece for retracting the pivot bolt.
Fig. 16 is a detached perspective view of the clamping and hinged connection for attaching one of the wheels of the wheel-mounted field piece to the motorcycle.

This hinged connection 41 consists of an ear 42 formed on said head 16 over which projects a pair of similar ears 43 formed on the lower jaw 44 of the clamp of the coupling device. A suitable bolt passes through the said ears and a pivotal connection is provided, the purpose of which is to permit of the easy riding of the combined motor cycle and gun carriage and more readily adapt the machine to the irregularities of the road or ground over which it is passing.

The clamping device shown comprises in addition to the lower jaw 44 an upper jaw 45 pivoted to said lower jaw at 46. A threaded bolt 47 is pivoted to the lower jaw at 48 and is adapted to swing within the bifurcated end 49 of the upper jaw and receive a suitable thumb nut 50. An opening 51 is formed between these respective jaws 44 and 45 and receives the stub axle of the inside wheel of the gun carriage, (see Fig. 5).

The wheel mounted field piece or gun carriage 2, comprises a frame 52 (see Figs. 1 and 9) having positioned thereon wheels 53 and 54. The outer wheel 53 is adapted to become the complementary wheel of the rear motorcycle wheel when the gun carriage and motor are assembled. The wheel 54 is adapted to be lifted out of axial alinement with the said wheel 53 and from off the ground when the gun carriage is connected to the motorcycle.

Figures 6, 7, 8:
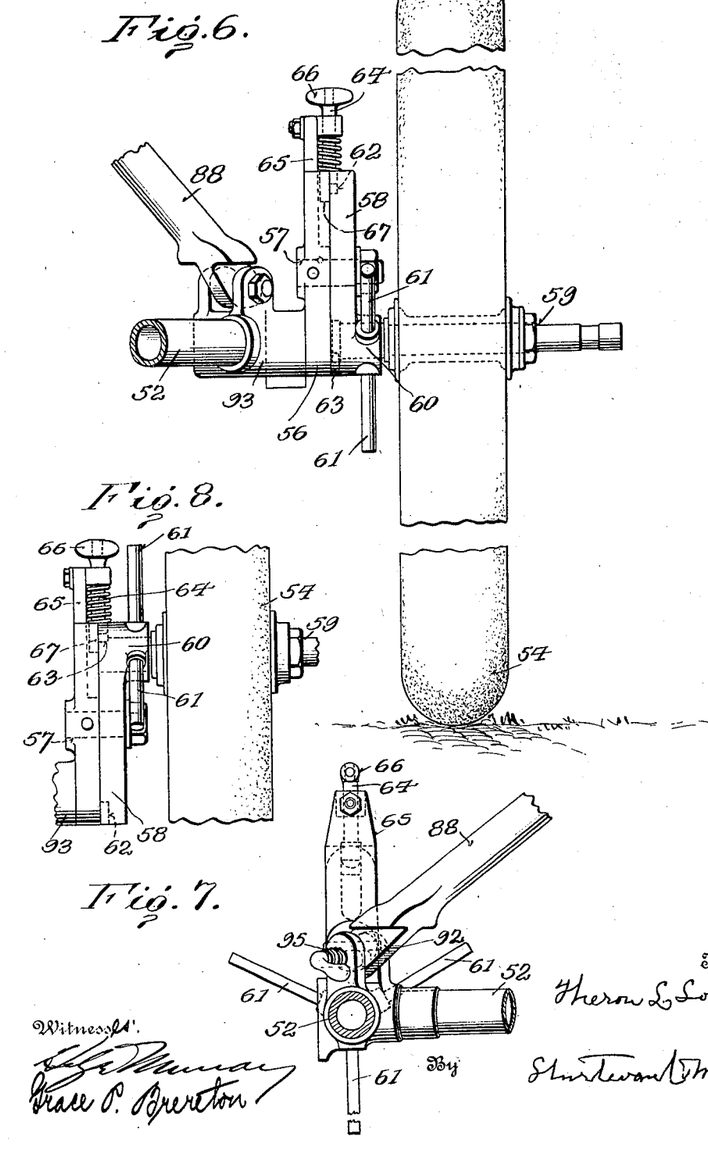
Fig. 6 is a detail view of one of the wheels and the mechanism for positioning it into and out of axial alinement with the other wheel of the mounted field piece, it being shown in the present instance in axial alinement with the complementary wheel.
Fig. 7 is a detail side elevation thereof.
Fig. 8 is a detail view of the said mechanism, showing the position thereof when the wheels are out of axial alinement with each other.

The mechanism for effecting this relative axial positioning of the wheels of the gun carriage will now be described. Located on the inner end of the frame axle member 55 is a projecting arm 56 having pivoted thereto at 57 a lever arm 58. On one end of the lever arm 58 a stub axle 59 is provided, about which is mounted the wheel 54 of the gun carriage. On the hub section 60 of this end of the arm 58 are provided radial arms or handles 61, the purpose of which is to facilitate the manipulation of the wheel 54 into and out of axial alinement with the wheel 53.

In each end of the arm 58 recesses 62 and 63 are provided respectively, into which fits alternately one end of a locking bolt 64 carried by a projection 65 of the arm 56. This locking bolt 64 is shown as comprising a spring-pressed rod having a suitable hand grip piece or knob 66 for purposes of easily retracting the bolt. The entire recess into which the bolt 64 extends is produced by a recess 67 formed in the arm 56 and arranged to mate with the respective recesses 62 and 63 when brought into register therewith respectively, after the arm 58 has been turned about the pivot 57.

From this construction it will be seen that when the gun carriage is assembled with the motorcycle, the recess 63 is brought into register with the recess 67, thereby locking the stub axle 59 and the wheel 54 carried thereby in a position sufficiently high to clear the ground and out of axial alinement with the wheel 53. When the gun carriage is detached from the motorcycle, the bolt 64 is retracted, and the arm 58 swung so as to bring the recess 62 into register with the recess 67, thereby bringing the wheel 54 into axial alinement with the wheel 53 for readily moving the gun carriage to the desired point of vantage.

It will be noted that in the first instance, namely that of the attached gun carriage, the stub axle 59 is held within the opening 51 in the coupling device 23, between the clamping jaws 44 and 45, and in the second instance, i. e., the disassembled position, the clamping jaw 45 has been lifted and the stub axle lifted out of the coupling device.

In addition to this coupling and associated mechanism, the gun carriage when attached to the motorcycle receives one end of the intermediate brace 36, the lower offset end 39 of which is reduced and is secured by a bolt connection 68 (see Figs. 1 and 15) to one side of the frame 52 of the gun carriage. The clamping member 69 adjustable on said frame 52, is provided with a suitable bifurcation 70, into which the end of the brace rod 36 extends.

The bolt 68 is spring-actuated by the spring 71 bearing against the collar 72 formed on or otherwise secured to the bolt, and the lowermost projection 73 of the clamping member. A projecting foot or hand piece 74 is formed on the end of the bolt 68, whereby it can be readily depressed in withdrawing the bolt 68.

By this construction of the adjustable pivotal connections of the brace rod 36, it will be obvious that the proper rigidity and other stability of the assembled device can be easily obtained.

Figure 1:
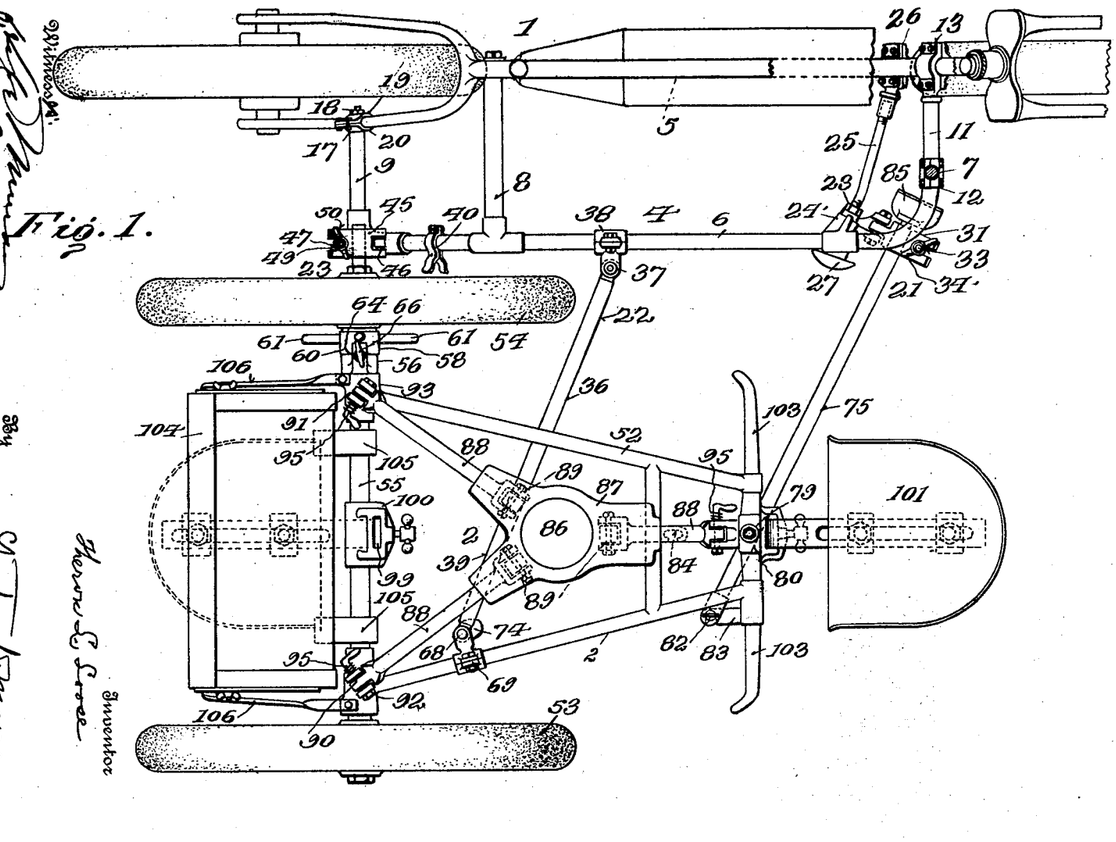
Figure 1 is a top plan view of the combined motorcycle and wheel-mounted field piece in assembled position for maneuvering (gun not shown)
Figure 2:
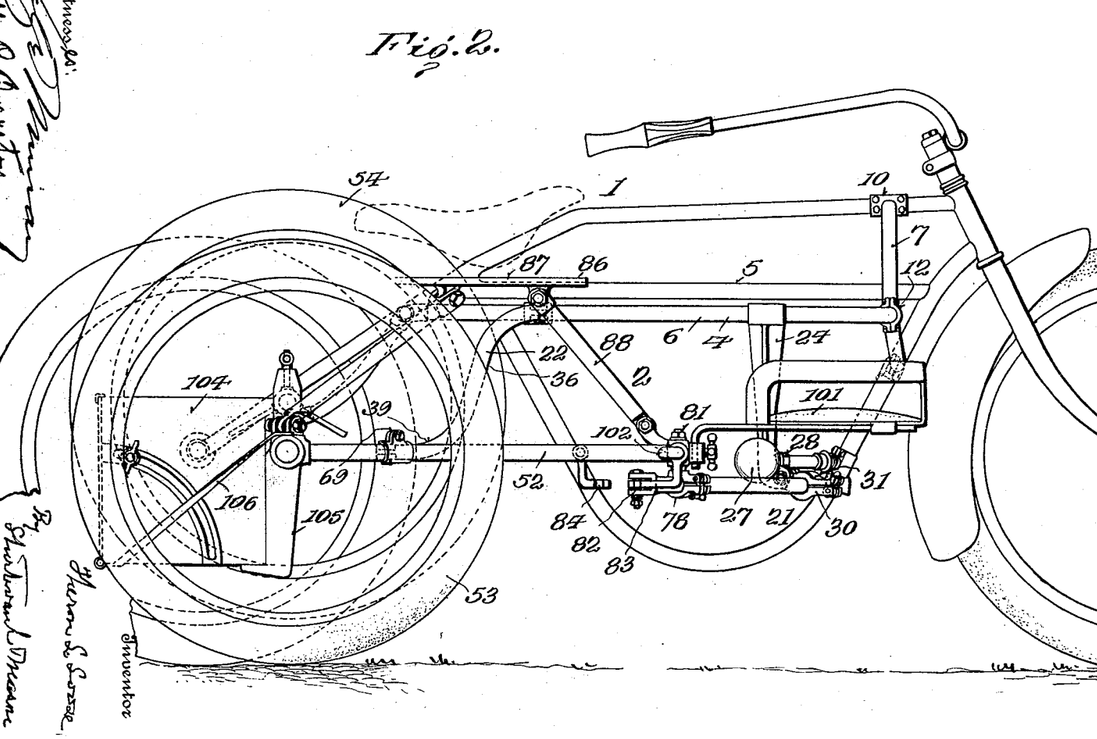
Fig. 2 is a side elevation thereof.
Figures 9, 10, 11, 12:
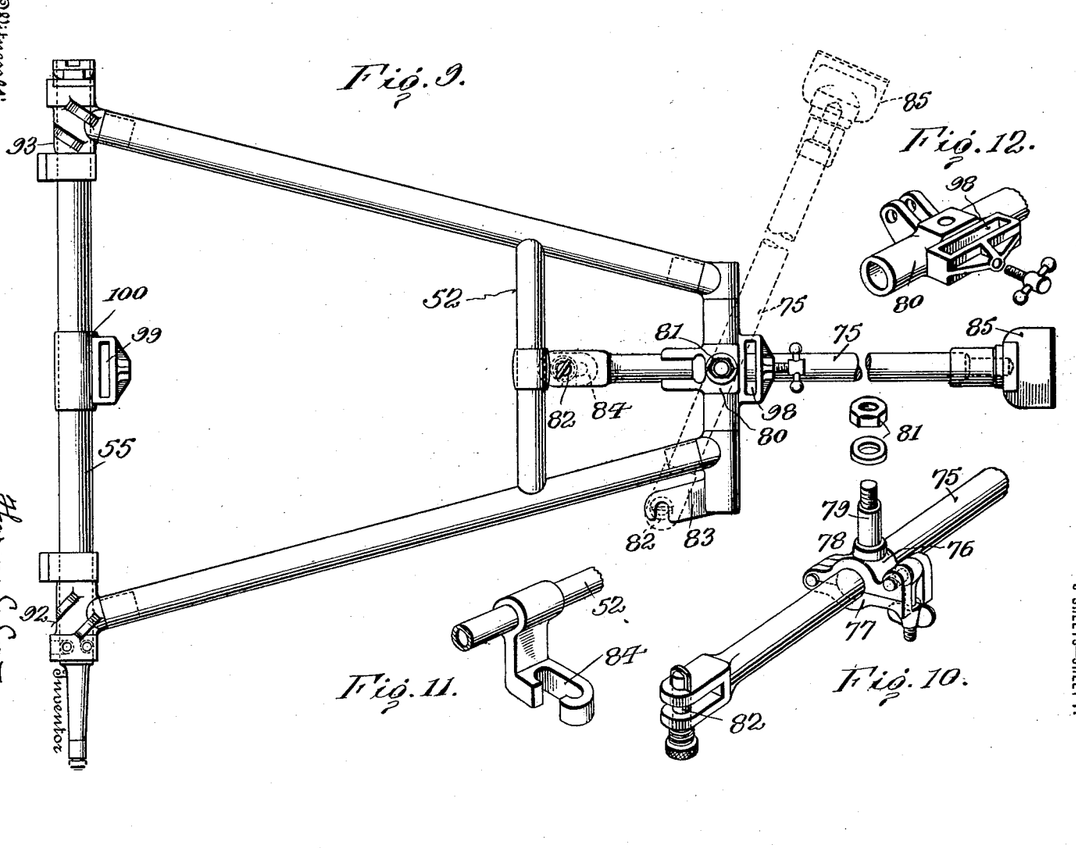
Fig. 9 is a detail plan view of the main supporting frame of the wheel-mounted field piece, showing the connecting brace or tongue in full lines when used on the detached field piece, and in dotted lines when extending laterally for connection with the motorcycle.
Fig. 10 is a perspective view of said tongue and its clamp and pivotal connection.
Fig. 11 is a detail perspective view of the receiving hook for holding the tongue in position when swung to the position shown in full lines in Fig. 9.
Fig. 12 is a detail perspective view of the pivotal and shield or seat post receiving head.
Figure 13:
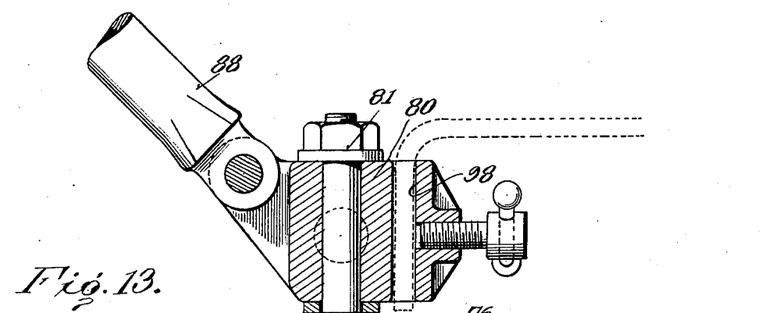
Fig. 13 is a detail sectional view through the said pivotal head, showing the tongue clamp and pivot connection.

The gun carriage frame 52 has associated with one end thereof a brace and tongue 75 pivoted near one end thereof to the said frame 52, and adapted to be fitted into the forward coupling device 21 near its other end when the motor and gun carriage are combined (see Fig. 1). As shown in Figs. 10 and 13, this tongue or brace 75 is held between the jaws 76 and 77 of the clamping device 78. A pivot stud 79 extends from this clamping device 78 into a head block 80, and receives a nut and washer 81 on the top thereof.

At one end of the tongue 75 a pin 82 is provided, the purpose of which is to engage a projecting hook 83 provided on one corner of the frame 52 (see Figs. 1, 9 and 10). In the position of the tongue shown in dotted lines in Fig. 9 it will be seen that the said tongue has been turned to extend laterally toward the motorcycle, the clamp 78 having been sufficiently loosened to permit the tongue to slide therethrough, and firmly held within the hook 83. The inner end of the tongue is now placed between the clamping jaws 30 and 31 of the coupling device 21, and securely clamped in position.

In the position of the tongue shown in full lines in Fig. 9, it will be apparent that the tongue has been uncoupled from the motorcycle and swung into a substantially longitudinal position of the gun carriage. In order that the necessary rigidity be given this tongue in this position a horizontally disposed open slot member 84 is provided on the frame 52 (see Figs. 9 and 11) into which the pin 82 carried on the end of the tongue 75 fits. Before tightening the clamp 78 through which the tongue 75 slides, the pin 82 can be brought into either the forward or rearward position of the said slot, and after tightening said clamp, either take up the pull when the gun carriage is to be moved independently of the motor, or receive the thrust from the kick of the gun when firing, respectively.

On one end of the tongue 75 a suitable earth plate or anchor 85 is provided. This may be varied in form, and as shown in the present case, perform the function of a handle or gripping means for moving the gun carriage when detached from the motorcycle. When the gun is set up for action, this plate is forced into the ground and receives the thrust or kick back, as will be readily understood.

The gun mount or support 86 is positioned upon the frame 52 and comprises a support 87 pivotally secured to a plurality of inclined bars 88 at 89. The opposite ends of the said bars 88 are pivotally mounted at 90, 91, in suitable blocks 92, 93, positioned at the corners of the rear cross bar of the frame 52, and the head block 80 at 94 hereinbefore referred to, and located centrally of the forward cross bar of the frame 52.

Spring latches 95 form the pivot bolts in the respective blocks 92, 93 and 80, and permit of the ready removal of the gun from the carriage should for any reason a different mounting be desired, or in case of destruction by the enemy it should be found advisable to abandon the carriage and save the gun.

The gun 3 is preferably of the regulation machine type, and is secured to the support 87 in any suitable manner. As the type of gun shown in Fig. 4 forms no part of this present invention, a further description thereof will not be given.

Figures 4, 17:
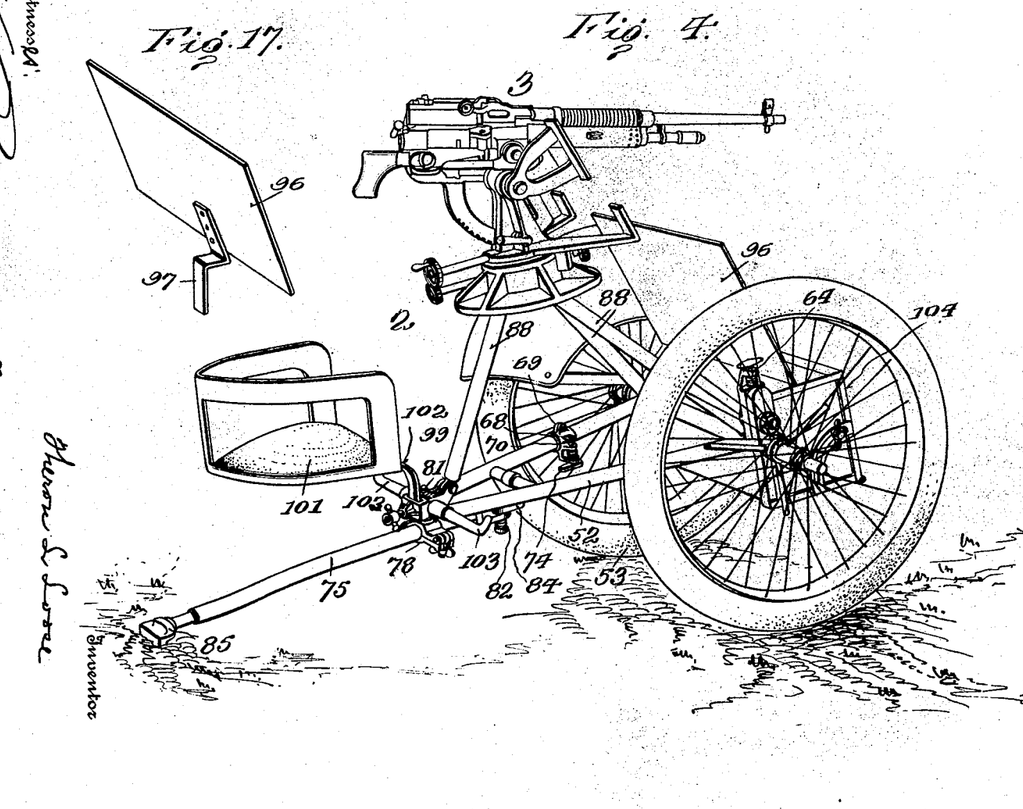
Fig. 4 is a similar view of the wheel-mounted field piece showing a gun mounted thereon and set for going into action.
Fig. 17 is a perspective view of a gun shield which can be positioned at either end of the wheel-mounted field piece.

A shield 96 is provided, as shown in Figs. 4 and 17. This shield is formed with a post 97 adapted to fit into a recess 98 in the head block 80 on the frame 52 when the gun is fired in the direction shown in Fig. 4, and when firing in the opposite direction it is adapted to fit into a recess 99 formed in a block 100 on the rear cross bar of the frame 52.

A suitable seat 101 is also provided for the operator of the machine gun, as shown in Fig. 4. The seat 101 is provided with a post 102 which fits into the above mentioned recesses 98 and 99 alternately with the shield 96 according to the direction of firing. Foot rests 103 are provided on the frame 52 for the operator of the gun.

The gun carriage is further provided with a munition receptacle 104, supported by hangers 105 from the rear cross bar of the frame 52 and a suitable strap 106 secured to the blocks 92 and 93, as shown.

Figure 5:
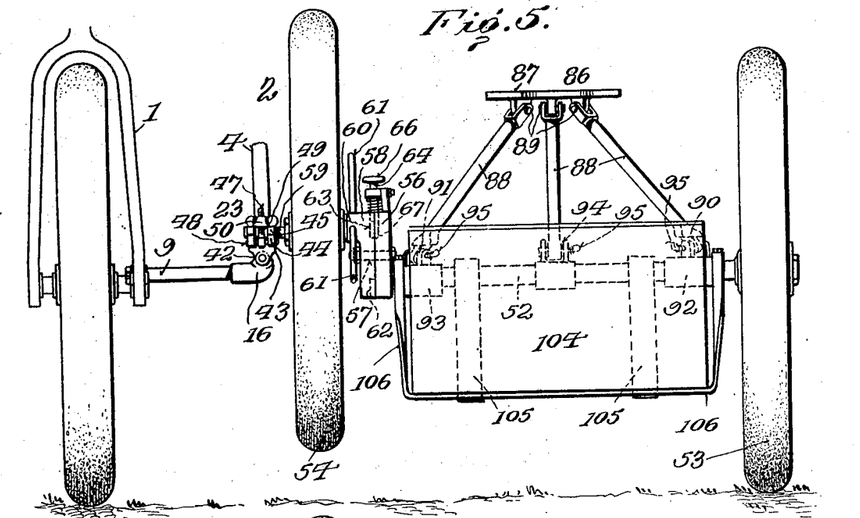
Fig. 5 is a rear view of the combined motorcycle and wheel-mounted field piece in assembled position, showing one wheel of said field piece forming a complementary wheel with the rear wheel of the motorcycle, and the other wheel elevated sufficiently high to clear the ground.

The operation of the present invention is apparent from the foregoing description. The respective advantages of the combined and independent machines are also obvious. When for example, the combined device is set up for road or cross country use, as shown in Figs. 1 and 5, a motor vehicle is produced possessing all of the advantages of flexibility, stability and ease in manipulation, whereby the highest possible speed can be attained in executing the desired military maneuvers over regular or irregular territories, as the circumstances may require.

Upon reaching the desired destination, the gun carriage is readily detached in the following manner: The coupling 21 is opened by unscrewing the thumb nut 34 and throwing back the upper jaw 31, thereby releasing the tongue or brace 75 of the gun carriage. The rear coupling 23 is likewise opened by unscrewing the thumb nut 50, lifting jaw 45, and removing the stub axle 59 of the wheel 54 of the gun carriage. The intermediate brace 36 is also released by depressing the spring bolt 68, thereby permitting the gun carriage to be completely detached from the motor. The mechanism for alining the respective wheels 53 and 54 of the gun carriage is now operated, and by retracting the bolt 64 and turning arm 58, the wheel 54 is swung into alinement with the wheel 53, as hereinbefore described. This operation of alining the respective wheels 53 and 54 may be performed prior to the removing of the stub axle 59 from the rear coupling 23 under a large majority of conditions.

The tongue 75 is now ready for positioning longitudinally of the gun carriage. The clamping device 78 is released sufficiently to permit the tongue 75 to slide therethrough. A slight movement of the tongue will now release the pin 82 from the hook 83, and the tongue is now ready to be into longitudinal alinement. As he fore described, the tongue is swung the pin 82 engages the open slot 84 ing from the frame 52 and relativ justed to receive the thrust accordin; direction of firing, after which the cl device 78 is tightened.

The gun carriage is now in positic removed to any desired point of  and immediately put into action.

The motorcycle is also now capabl dependent use and can either be cc or immediately pressed into serv scouting purposes, or the like.

Figure 18:
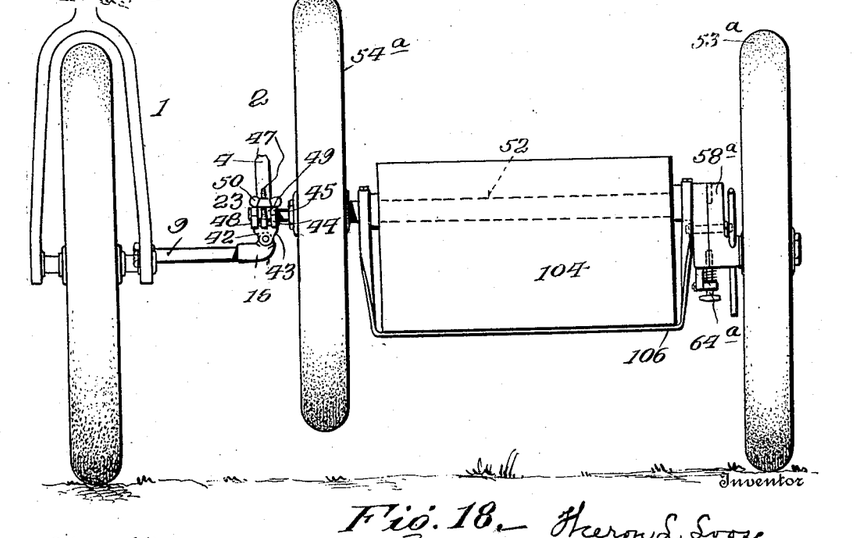
Fig. 18 is a rear view of the assembled device, showing a modification of the mechanism for throwing one wheel of the mounted field piece into and out of axial alinement with the other wheel, according to whether it is detached from the motorcycle or attached thereto.

In Fig. 18 of the drawings, a mod: of the mechanism for alining the re: wheels of the gun carriage is showr mechanism is similar to that herei described, but is positioned differe shown. Instead of coöperating w stub axle on the inside wheel 54ᵃ, verted and positioned to relatively the outside wheel 53ᵃ.

In effecting an alinement of the re wheels 53ᵃ and 54ᵃ, it will be seen retracting the bolt 64ᵃ, the arm 58ᵃ is so as to lift the stub axle support wheel 53ᵃ, thereby alining the wheels As hereinafter mentioned, this o] can be performed either before or ε moving the inside stub axle from 1 pling device 23.

From the foregoing, it will be a that a combined motor vehicle and gun has been produced, in which conditions of modern warfare can k combated, under favorable and a geous positions heretofore impractic.

While I have described particul: use of a machine gun in connection motorcycle, it will be understood actly the same clamping and connec rangements may be used if the side caisson or ammunition box, instet frame especially adapted for carryi machine.

Having thus described my in what I claim as new and desire t by Letters Patent, is:—

1. A combined vehicle of the c scribed, including in combination  cycle having an auxiliary frame an carriage having relatively alined and connections between the gun and the motorcycle, one of the whee gun carriage forming a comple wheel with one wheel of the m( when attached to said auxiliary fr: means for raising and lowering t wheel of the gun carriage and lock either position.

2. A combined vehicle of the  scribed, including in combination  cycle having an auxiliary frame, a riage detachably connected to said frame, wheels mounted on said gun carriage, and means for locking one wheel of said gun carriage in elevated position when attached to said frame, and for alining the said adjustable wheel of the gun carriage when the latter is detached from said motorcycle.

3. A combined vehicle of the class described, including in combination a motorcycle, a wheel-mounded gun carriage having a pivoted tongue slidably mounted in said gun carriage, and means including a clamp carried by the gun carriage for securing said tongue in position when attached to the motorcycle and for securing said tongue in longitudinal alinement with the gun carriage when detached from the motorcycle.

4. A combined vehicle of the class described, including in combination a motorcycle, a wheel-mounted gun carriage having a pivoted tongue slidably mounted in said gun carriage, a plurality of hook-engaging members adapted to receive one end of said tongue, a clamping device for securing said tongue when engaged by one of said hook-members, and means provided in one of said hook members for longitudinally adjusting the said tongue therein when alined with the gun carriage.

5. A combined vehicle of the class described, including in combination a motorcycle having an auxiliary frame, a coupling device carried on the forward end of said frame, a swiveled coupling and supporting device provided on the rear end of said frame, a wheel-mounted gun carriage detachably connected to said motorcycle and having a stub shaft projecting from one of the wheels adapted to be supported and secured in said swivel coupling, a pivoted tongue carried by said gun carriage adapted to be secured in said forward coupling device, and means including an intermediate detachable brace carried by the auxiliary frame for further securing said gun carriage to the motorcycle.

6. A combined vehicle of the class described, including in combination a motorcycle, a wheel-mounted gun carriage detachably connected to said motorcycle comprising a frame, a plurality of oppositely-arranged post-receiving and securing devices carried by said frame, and a reversible seat and reversible shield adapted to be positioned in said post-receiving and securing devices respectively.

7. A combined vehicle of the class described, including in combination a motorcycle, a wheel-mounted gun carriage detachably connected to said motorcycle comprising a frame, oppositely-arranged wheels carried by the said frame, a vertical support provided on said frame, a lever mounted on said vertical support adapted to support one of the wheels of the gun carriage, and means including a locking bolt adapted to secure the said lever in position.

8. A combined vehicle of the class described including in combination, a motorcycle, a wheel-mounted gun carriage detachably connected to said motorcycle comprising a frame, oppositely-arranged wheels carried by the said frame, a support provided on one corner of said frame, a lever mounted on said support having rotatably mounted thereon one of the wheels of the gun carriage, and means including a locking bolt adapted to secure the said lever in position.

9. A combined vehicle of the class described, including in combination a side car and a motorcycle, an auxiliary frame attached to the motorcycle comprising a longitudinal bar spaced from the motorcycle, a plurality of lateral braces connecting said longitudinal bar to the motorcycle, an overhanging and depending brace interposed between said auxiliary frame and motorcycle, another lateral and upstanding brace interposed between said auxiliary frame and motorcycle, and means carried by said auxiliary frame for detachably connecting a side car thereto.

In testimony whereof, I affix my signature, in the presence of two witnesses.

THERON L. LOOSE.

Witnesses:
C. L. STURTEVANT,
JOHN D. STEPHENS.

Copies of this patent may be obtained for five cents each, by addressing the "Commissioner of Patents, Washington, D. C."